(12) United States Patent
Sanpei et al.

(10) Patent No.: US 6,778,939 B2
(45) Date of Patent: Aug. 17, 2004

(54) ROTATIONAL ANGLE DETECTOR WHICH PREVENTS CONTROLLED SYSTEM FROM BEING IMPROPERLY CONTROLLED

(75) Inventors: Yoshio Sanpei, Miyagi-ken (JP); Hironori Kato, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 10/200,887

(22) Filed: Jul. 23, 2002

(65) Prior Publication Data

US 2003/0023400 A1 Jan. 30, 2003

(30) Foreign Application Priority Data

Jul. 30, 2001 (JP) ........................................ 2001-229847
Jul. 30, 2001 (JP) ........................................ 2001-229859

(51) Int. Cl.[7] .............................................. G01B 7/30
(52) U.S. Cl. .................... 702/151; 702/163; 324/207.2; 324/207.25; 701/41; 180/422
(58) Field of Search .............. 702/151, 95; 250/231.16, 250/231.43; 701/41; 180/480, 422, 429

(56) References Cited

U.S. PATENT DOCUMENTS

| | | | |
|---|---|---|---|
| 4,996,657 A | * | 2/1991 | Shiraishi et al. ............ 702/151 |
| 5,135,069 A | | 8/1992 | Hattori et al. ............... 180/422 |
| 5,949,067 A | * | 9/1999 | Sano ...................... 250/231.13 |
| 6,330,522 B1 | * | 12/2001 | Takeuchi .................... 702/151 |

FOREIGN PATENT DOCUMENTS

| | | |
|---|---|---|
| DE | 41 30 142 | 3/1993 |
| DE | 196 51 771 | 4/1998 |
| EP | 0 338 559 | 10/1998 |
| EP | 1 108 987 | 6/2001 |
| EP | 1 225 427 | 7/2002 |

* cited by examiner

*Primary Examiner*—John Barlow
*Assistant Examiner*—Hien Vo
(74) *Attorney, Agent, or Firm*—Brinks Hofer Gilson & Lione (57) ABSTRACT

A rotational angle detector which comprises: a rotational angle detecting section which detects an angle detection signal correspondent to a rotational state of a rotor in a short cycle and feeds it to a control section; the control section which calculates the fed angle detection signal and sends an angle set signal through a controller to a controlled system; and a memory which stores the angle detection signal temporarily and also stores an allowable maximum angle value for the angle detection signal, wherein the control section makes the output cycle for the angle set signal longer than the detection cycle for the angle detection signal and counts the number of times when the angle detection signal as fed within the long output cycle for the angle detection signal is beyond the allowable maximum angle value and, if it decides that the count is beyond a preset number, outputs an abnormality signal instead of the angle set signal.

21 Claims, 9 Drawing Sheets

ROTATIONAL ANGLE DETECTOR WHICH PREVENTS CONTROLLED SYSTEM FROM BEING IMPROPERLY CONTROLLED

BACKGROUND OF THE INVENTION

1. Field of the Invention

The present invention relates to a rotational angle detector, and particularly to a rotational angle detector which prevents a controlled system from being improperly controlled by promptly identifying an abnormality of a detected angle detection signal or by promptly outputting an angle set signal with an abnormality signal added, when the rotational state of a rotor such as the steering shaft of a vehicle is detected as an angle detection signal, an angle set signal is generated based on the result of the detection and the controlled system is controlled using the angle set signal.

2. Description of the Related Art

Generally a rotational angle detector is designed to detect the rotational angle of a rotor to control a controlled system according to the result of the detection. It comprises at least the following: a rotational angle detecting section which detects the rotational state of the rotor, generates an angle detection signal and sends the angle detection signal to a control section; a control section which generates an angle set signal by performing calculation on the received angle detection signal in a prescribed manner and sends the angle set signal to a bus line; and a controller which receives the angle set signal sent through the bus line and controls the controlled system in response to the received angle set signal.

When this rotational angle detector is to be used to detect the rotational angle of the steering shaft of a vehicle, the detector is mounted in the vehicle with its rotational angle detection section connected to the steering shaft of the vehicle.

Various types of rotary sensors are available for use in the rotational angle detecting section of a rotational angle detector mounted in a vehicle. One such rotary sensor will be described next.

Figure 10A:
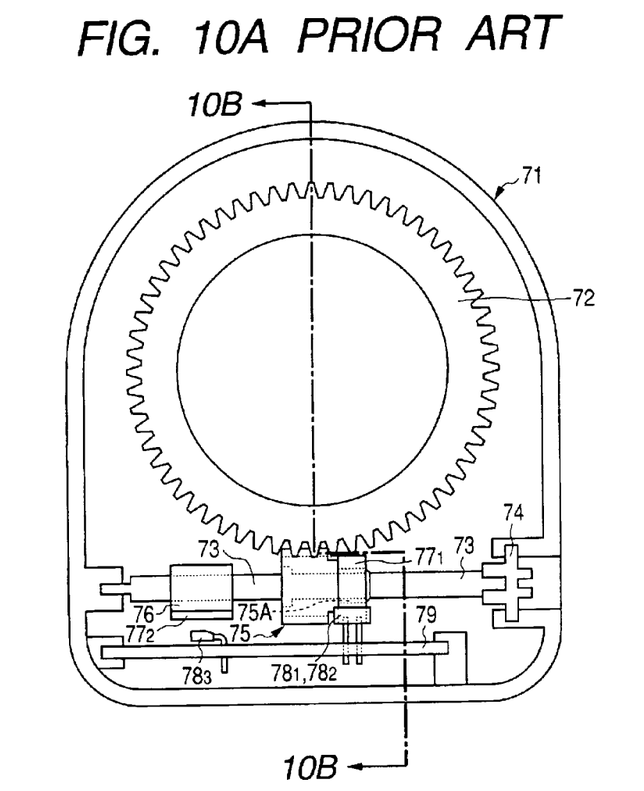
FIG. 10 is a sectional view showing the structure of a conventional rotary sensor as an example.
Figure 10B:
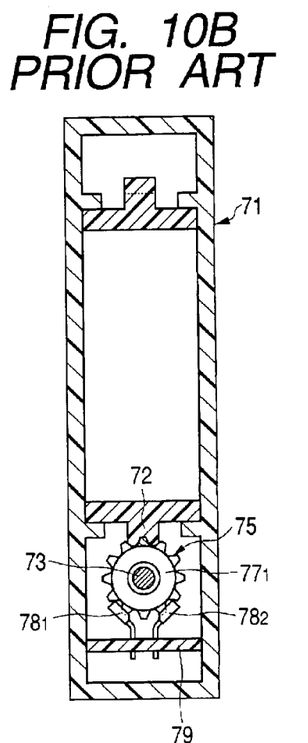

FIG. 10A and FIG. 10B are sectional views showing an example of the structure of one of the above-said rotary sensors; FIG. 10A is a transverse sectional view and FIG. 10B is a sectional view taken along the line 10B—10B of FIG. 10A.

As illustrated in FIG. 10A and FIG. 10B, this rotary sensor comprises: a case 71, a rotor 72, a rotary shaft 73, a bearing 74, a worm gear 75, a slider 76, a first magnet $77_1$, a second magnet $77_2$, a first Hall element $78_1$, a second Hall element $78_2$, a third Hall element $78_3$, and a circuit board 79. In this case, the rotor 72 is connected with the steering shaft of the vehicle at its center and there are many gear teeth on its circumference. The rotary shaft 73, around which the worm gear 75 is fitted, rotates in conjunction with the worm gear 75. The screw grooves in the outer surface of the rotary shaft 73 engage with the screw grooves in the inner surface of the slider 76 so that the slider 76 slides in the axial direction of the rotary shaft 73 as the rotary shaft 73 turns. When the worm gear 75 and the gear teeth of the rotor 72 engage with each other and the rotor 72 turns, the rotary shaft 73 also turns by the mediation of the worm gear 75 at a prescribed rotation ratio with respect to the rotor 72. The worm gear 75 has a cylindrical magnet holder 75A at one end of it and the cylindrical first magnet $77_1$ is fitted on the circumference of the magnet holder 75A. The slider 76 has a planar second magnet $77_2$ attached on its outer surface. Attached on the circuit board 79, which is arranged in parallel to the rotary shaft 73, are the first Hall element $78_1$, the second Hall element $78_2$ and the third Hall element $78_3$. The first Hall element $78_1$ and the second Hall element $78_2$ are located adjacent to the outer surface of the first magnet $77_1$, forming an angle of approximately 90 degrees with respect to the central axis of the first magnet $77_1$. The third Hall element $78_3$ is located adjacent to the outer surface of the second magnet $77_2$.

As the rotor 72 turns, a sinusoidal waveform first angle detection signal and a sinusoidal waveform second angle detection signal are issued with a quarter-wave phase difference from the first Hall element $78_1$ and the second Hall element $78_2$ respectively, with a constant maximum amplitude and the same cycle. At the same time, the third Hall element $78_3$ issues a third angle detection signal which increases linearly with the full rotation range of the rotor 72 constituting one cycle.

The first angle detection signal, second angle detection signal and third angle detection signal from the rotary sensor are sent to the control section. The control section roughly determines the rotational angle and direction with respect to the neutral position of the steering wheel (steering shaft) according to the received third angle detection signal and finely determines the rotation angle with respect to the neutral position of the steering wheel according to the received first and second angle detection signals. The control section generates an angle set signal based on the result of detection of the rotational angle and direction with respect to the neutral position of the steering wheel, and sends the generated angle set signal through the bus line to the controller. According to the angle set signal it has received, the controller accurately controls a controlled system such as the suspension system or traction control system of the vehicle.

Figure 8:
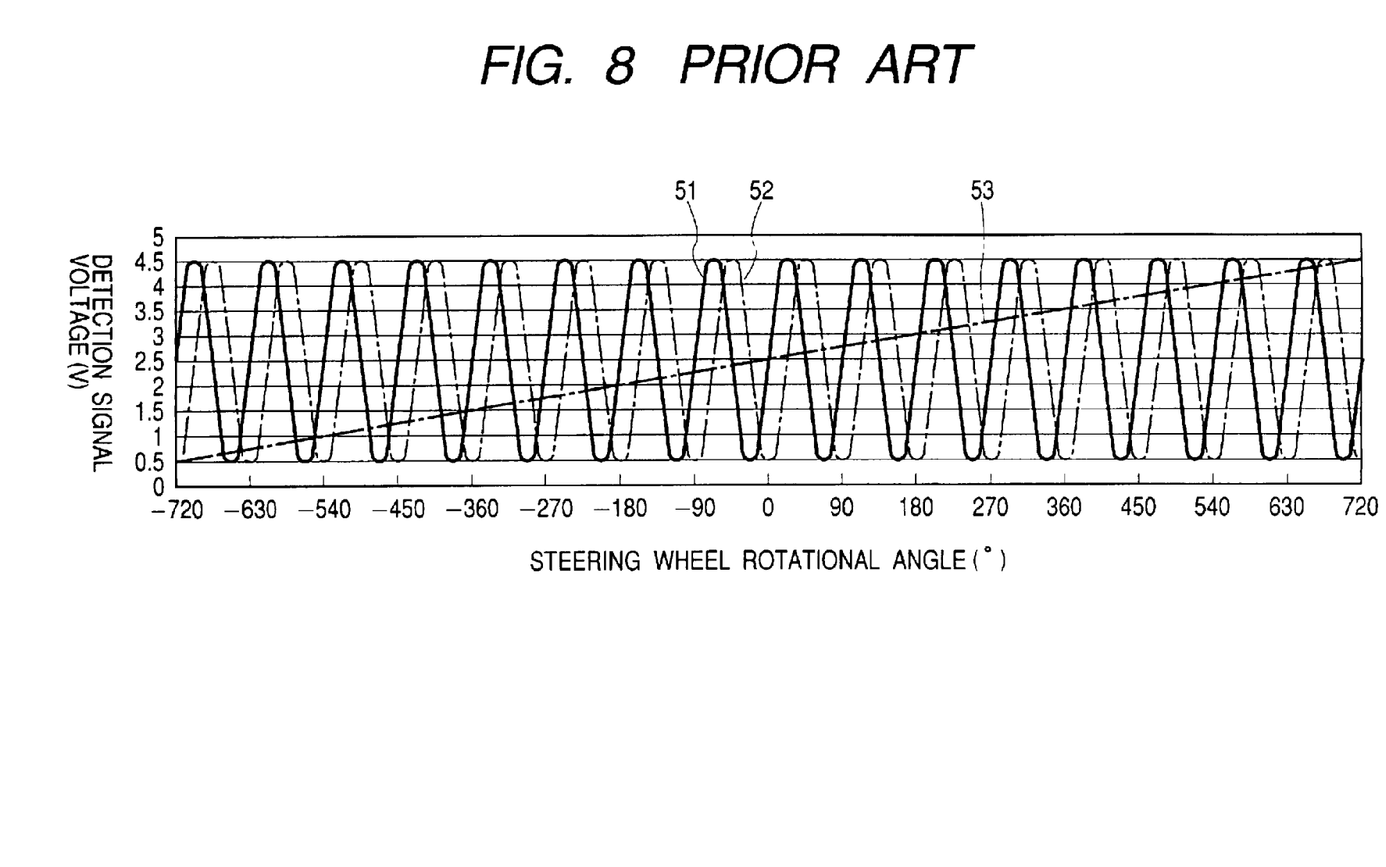
FIG. 8 is a characteristic graph showing the relation between the steering wheel rotational angle and the voltage of each of the first to third angle detection signals, which are all sent from the rotary sensor, in a rotational angle detector based on the known rotary sensor.

FIG. 8 is a characteristic graph showing the relation between the steering wheel rotational angle and the voltage of each of the first to third angle detection signals, which are all sent from the rotary sensor, in a rotational angle detector based on the above-said rotary sensor.

In FIG. 8, reference numeral 51 represents the first angle detection signal, 52 the second angle detection signal and 53 the third angle detection signal; this graph shows changes in the voltage of each of the first to third angle detection signals 51, 52, 53 in the whole range of steering wheel rotation (±720 degrees from the neutral position).

Here, the first angle detection signal 51 and the second angle detection signal 52 are sinusoidal waveform signals with the same maximum amplitude and the same cycle, between which there is a quarter-wave phase difference, where they both have a maximum voltage of 4.5 V and a minimum voltage of 0.5 V. For the first angle detection signal 51, the voltage is the minimum (0.5 V) at a rotational angle of −22.5 degrees from the neutral position (0 degree) and rotational angles decreasing from −22.5 degrees in decrements of −90 degrees, and at a rotational angle of +67.5 degrees and rotational angles from +67.5 degrees in increments of +90 degrees. For the second angle detection signal 52, the voltage is the minimum (0.5 V) at a rotational angle of 0 degree (neutral position) and rotational angles decreasing from 0 degree in decrements of −90 degrees and rotational angles increasing from 0 degree in increments of +90 degrees. For the third angle detection signal 53, the voltage linearly increases over the rotational angle range from −720 degrees to +720 degrees, with the minimum voltage (0.5 V)

at −720 degrees of rotational angle and the maximum voltage (4.5 V) at +720 degrees of rotational angle.

Figure 9:
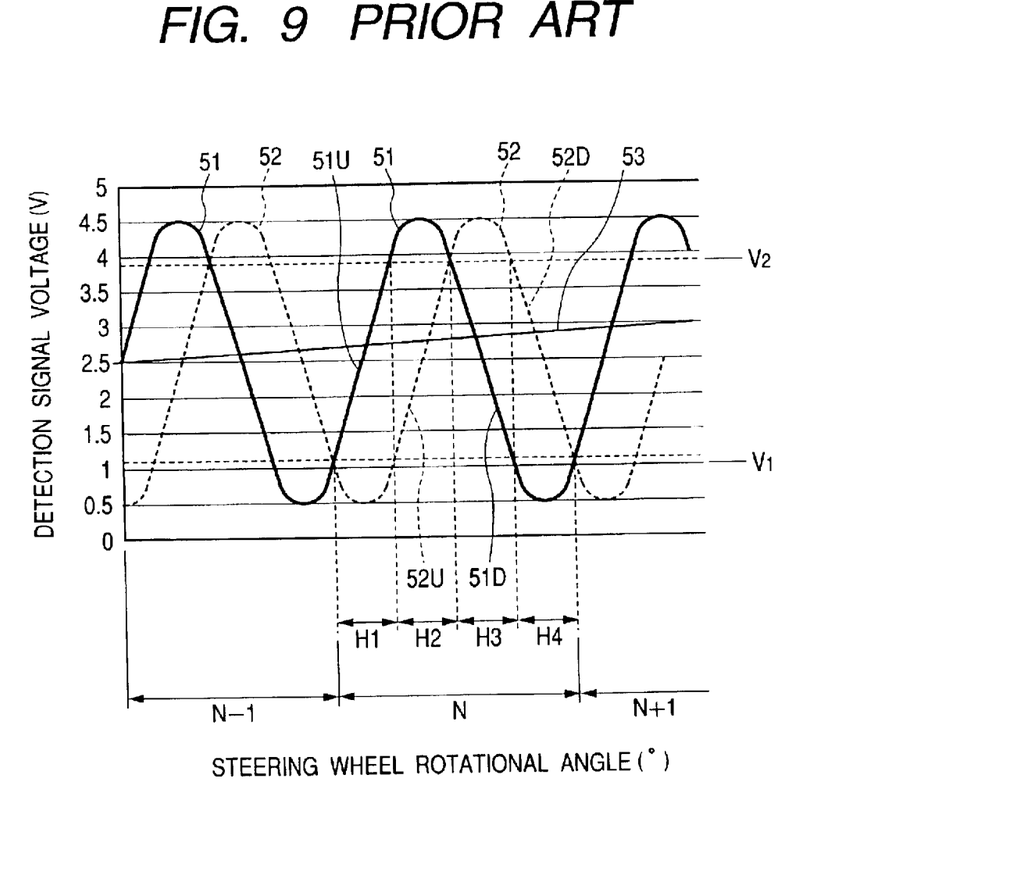
FIG. 9 is a characteristic graph showing the portion ranging from −90 degrees to +90 degrees of FIG. 8 in enlarged form.

FIG. 9 is a fragmentary view of the characteristic graph in FIG. 8 where the part ranging from −90 degrees to +90 degrees is enlarged.

In FIG. 9, 51U represents a virtually linear leading edge (gradient) for the first angle detection signal 51, 51D a virtually linear trailing edge (gradient) for the first angle detection signal 51, 52U a virtually linear leading edge (gradient) for the second angle detection signal 52, and 52D a virtually linear trailing edge (gradient) for the second angle detection signal 52. The same other elements as those shown in FIG. 8 are designated with the same reference numerals.

Next, how the rotational direction and angle of the steering wheel are detected by the control section will be explained referring to the characteristic graphs shown in FIG. 8 and FIG. 9.

First, the control section detects the rotational direction from the neutral position (rotational angle of 0 degree) of the steering wheel according to the voltage of the third detection signal it has received. Concretely, if the voltage of the third detection signal 53 is over 2.5 V, it detects that the steering wheel has been turned in one direction (positive angle), while if the voltage of the third detection signal 53 is below 2.5 V, it detects that the steering wheel has been turned in the other direction (negative angle).

Next, the control section roughly determines a rotational angle as follows. As illustrated in FIG. 9, the whole rotational angle range of the steering wheel (for example, 1440 degrees, or ±720 degrees) is divided into segments named N−1, N, N+1 and so on with one segment (for example, 90 degrees) corresponding to one wavelength of the first angle detection signal 51 and second angle detection signal 52. The control section detects in which of the angle segments N−1, N, N+1 the voltage of the received third angle detection signal 53 falls, in order to determine a rough rotational angle. For instance, if the voltage of the third angle detection signal 53 is found to be 2.8 V, the control section determines that it is the angle segment N that corresponds to that voltage.

Then, from the angle segment N, the control section obtains the first voltage value $V_1$ and second voltage value $V_2$, or points where the voltage of the received first angle detection signal 51 coincides with that of the second angle detection signal 52. Referring to the first voltage value $V_1$ and second voltage value $V_2$ thus obtained, the control section identifies either of the angle detection signals as a signal out of the $V_1$–$V_2$ range and the other signal as a signal within the $V_1$–$V_2$ range, in each sub-segment of the segment N.

Then, the control section decides whether the other angle detection signal within the $V_1$–$V_2$ range is either the first angle detection signal 51 or the second angle detection signal 52. At the same time, the control section decides whether the one angle detection signal out of the $V_1$–$V_2$ range is either smaller than the first voltage value $V_1$ or larger than the second voltage value $V_2$. Also it determines in which one of the four sub-segments (the first sub-segment H1, second sub-segment H2, third sub-segment H3 and fourth sub-segment H4) of the angle segment N the other angle detection signal, which is within the $V_1$–$V_2$ range, falls. In this way, the rotational angle of the steering wheel is determined more accurately by finding in which sub-segment (among the sub-segments H1 to H4 of the angle segment N) does the other angle detection signal fall.

In the example shown in FIG. 9, for the other angle detection signal which is within the $V_1$–$V_2$ range, the part in the first sub-segment H1 corresponds to the linear leading edge (gradient) 51U of the first angle detection signal 51; the part in the second sub-segment H2 corresponds to the linear leading edge (gradient) 52U of the second angle detection signal 52; the part in the third sub-segment H3 corresponds to the linear trailing edge (gradient) 51D of the first angle detection signal 51; and the part in the fourth sub-segment H4 corresponds to the linear trailing edge (gradient) 52D of the second angle detection signal 52.

As a consequence of the above-mentioned operational sequence, the control section finally determines the angle of the steering wheel from the first to third angle detection signals 51 to 53 it has received, and generates an angle set signal based on the determined angle.

In the known rotational angle detector as mentioned above, when a rotary sensor (rotational angle detecting section) as suggested above is employed, the rotary sensor sends the first angle detection signal 51, second angle detection signal 52 and third angle detection signal 53 to the control section as the rotor turns. When determining the rotational direction and angle according to the received first to third angle detection signals 51 to 53, the control section first detects the rotor's rotational direction and rough rotational angle based on the amplitude (voltage) of the third angle detection signal 53, and then more accurately determines the rotor's rotational angle based on the linear gradient of the first and second angle detection signals 51 and 52. Therefore, the control section can detect the rotor's rotational angle and direction over a wide angle range with high accuracy and thus produce an angle set signal from the detection result with high accuracy.

However, since a rotational angle detector having the above-suggested rotary sensor (rotational angle detecting section) directly uses the first angle detection signal 51, second angle detection signal 52 and third angle detection signal 53 to detect the rotational angle and direction of the rotor, if an incorrect angle detection signal is sent from the rotary sensor for some reason, detection of rotational angle and direction detection is performed according to the incorrect angle detection signal and consequently an incorrect angle set signal is fed from the control section to the controller. If the controller has received the incorrect angle set signal, it fails to control the suspension system or traction control system of the vehicle properly; if this phenomenon continues, it will become difficult to control the vehicle properly.

SUMMARY OF THE INVENTION

The present invention has been made in view of the above technical background; the primary object of the invention is to provide a rotational angle detector which eliminates the possibility of output of an incorrect angle set signal by promptly identifying the feed of an incorrect angle set signal, or by outputting an angle set signal with an abnormality signal added upon detection of an abnormality, in order to prevent incorrect control based on an incorrect angle set signal.

In order to achieve the above object, according to one aspect of the present invention, a rotational angle detector comprises: a rotational angle detecting section which detects an angle detection signal correspondent to a rotational state of a rotor in a short cycle and feeds the angle detection signal to a control section; the control section which calculates the angle detection signal fed from the rotational angle detecting section and sends an angle set signal through a controller to a controlled system; and a memory which stores the angle detection signal temporarily and also stores an allowable maximum angle value for angle detection signals, wherein the control section has a means to make an output cycle for the angle set signal longer than a detection cycle for the angle detection signal and count a number of times when the angle detection signal as fed within the long output cycle for angle detection signals is beyond the allowable maximum angle value and, if the count is judged as being beyond a preset number, output an abnormality signal instead of the angle set signal.

In the above means, the memory stores the allowable maximum angle value for angle detection signals; and the control section counts the number of times when the angle detection signal as fed within a long output cycle for angle set signals is beyond the allowable maximum angle value and, if it decides that the count is above a preset number, outputs an abnormality signal in the next output cycle for angle set signals instead of the angle set signal. Therefore, thanks to output of the abnormality signal, the user of the rotational angle detector can not only immediately be notified of the presence of an abnormality in the operation of the rotational angle detector but also avert the risk of the controlled system being improperly controlled due to the feed of an incorrect angle set signal.

According to another aspect of the present invention, in the rotational angle detector, it is desirable that the detection cycle for angle detection signals be 400 microseconds or less and the output cycle for angle set signals be 10 milliseconds or less.

With this arrangement, when the rotational angle detector is used for the steering wheel of a vehicle, variation per detection cycle is 0.8 degree or less because the maximum rotating rate of the steering wheel may be 2000 degrees/sec. This detection accuracy is much higher than the required detection accuracy for a product, or 1.5 degrees; in other words, abnormalities can be detected with high accuracy.

According to a further aspect of the present invention, in the rotational angle detector, it is desirable to judge the count (number of times when the angle detection signal is beyond the allowable maximum value) as being beyond the preset number when two out of three consecutive counts are found beyond the preset number.

With this arrangement, the controlled system can be controlled in response only to an abnormality signal to be addressed, which arises from an abnormal operation, without responding to external noise or any other abnormal signal which need not be addressed, so that the controlled system can be controlled efficiently and smoothly.

According to a further aspect of the present invention, in the rotational angle detector, it is desirable to judge the count (number of times when the angle detection signal is beyond the allowable maximum value) as being beyond the preset number when six out of 64 consecutive counts are found beyond the preset number.

With this arrangement, the probability of avoiding unnecessary control over abnormal signals caused by mere momentary external noise is increased and sporadic permanent abnormalities can be detected so that the controlled system can be controlled with more safety.

Furthermore, according to a further aspect of the present invention, the rotational angle detector comprises: a rotational angle detecting section which detects an angle detection signal correspondent to a rotational state of a rotor and feeds the angle detection signal to a control section; the control section which calculates the angle detection signal fed from the rotational angle detecting section to generate an angle set signal and sends the generated angle set signal through a controller to a controlled system; and a memory which stores an allowable maximum setting, wherein the control section has means to concurrently perform a first calculation step and a second calculation step for the angle detection signal fed from the rotational angle detecting section to generate a first angle set signal and a second angle set signal, calculate the difference between the first angle set signal and second angle set signal, compare the calculated difference with the allowable maximum setting, and if the calculated difference is judged as being above the allowable maximum setting, output an abnormality signal instead of the angle set signal.

In the above means, the memory stores the allowable maximum setting and the control section concurrently performs a first calculation step and a second calculation step for the angle detection signals fed from the rotational angle detecting section to generate a first angle set signal and a second angle set signal, calculates the difference between the first angle set signal and second angle set signal, compares the calculated difference with the allowable maximum setting read from the memory, and the calculated difference is judged as being below the allowable maximum setting, generates and outputs a given angle set signal at the time of angle set signal output, while if the calculated difference is judged as being above the allowable maximum setting, generates and outputs an abnormality signal in addition to a given angle set signal at the time of angle set signal output. Therefore, thanks to output of the abnormality signal, the user of the rotational angle detector can not only immediately be notified of the presence of an abnormality in the operation of the rotational angle detector but also avert the risk of the controlled system being improperly controlled due to the feed of an incorrect angle set signal.

According to a further aspect of the present invention, in the rotational angle detector, it is desirable for the control section to perform the first calculation step and the second calculation step using different lookup tables.

With this arrangement, if either of the lookup table for the first step and the lookup table for the second step contains some fault, the result of comparison made in an output decision section will be different from the normal result whenever that fault is picked up, which makes it possible to identify the presence of a fault with more reliability.

According to a further aspect of the present invention, in the rotational angle detector, it is desirable for the control section to perform the first calculation step and the second calculation step using different algorithms.

With this arrangement, if either of the algorithm for the first step and the algorithm for the second step contains some fault, the result of comparison made in the output decision section will be different from the normal result whenever that fault is picked up, which makes it possible to identify the presence of a fault with more reliability. Also, the algorithms' portions with low abnormality detection accuracy are mutually complementary so that the abnormality detection capability can be improved.

According to a further aspect of the present invention, in the rotational angle detector, it is desirable for the control section to detect an angle detection signal in a short cycle and output the angle set signal in a cycle longer than the detection cycle for angle detection signals.

With this arrangement, an abnormal operation can be detected before the rotational angle detection signal output cycle, and the abnormality signal concerned is outputted in combination with an angle set signal selected from the memory as appropriate, thereby preventing the controlled system from being controlled improperly.

According to a further aspect of the present invention, in the rotational angle detector, it is desirable that the first calculation step and the second calculation step be performed by different control sections.

With this arrangement, if either of the calculating operation for the first step and the calculating operation for the second step contains some fault, it is possible to avert the risk of failing to output an abnormality signal which might arise if two calculating operations having the same kind of fault should output the same result and produce no result difference; therefore the probability of picking up faults is increased and faults can be detected with more reliability.

BRIEF DESCRIPTION OF THE DRAWINGS

The invention will be more particularly described with reference to the accompanying drawings, in which.

DETAILED DESCRIPTION OF THE PREFERRED EMBODIMENTS

Next, a first embodiment of the present invention will be described referring to the relevant accompanying drawings.

Figure 1:
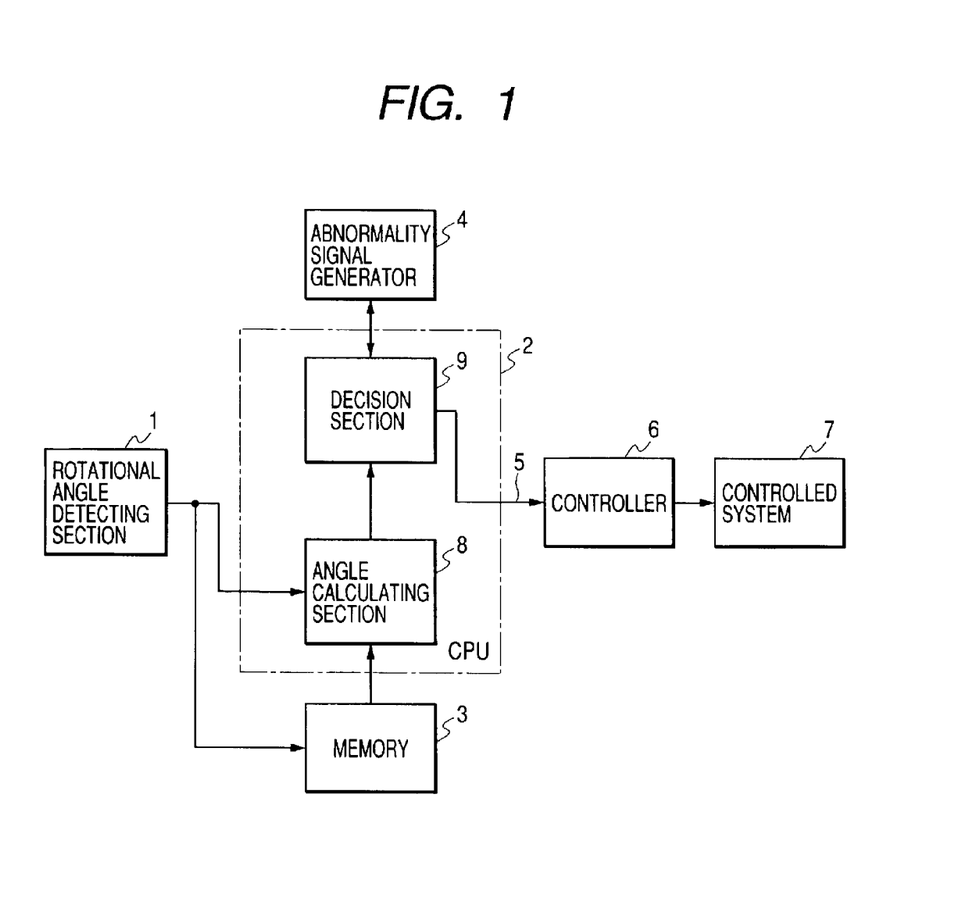
FIG. 1 is a block diagram showing the main structure of a rotational angle detector according to a first embodiment of the present invention.

FIG. 1 is a block diagram showing the main structure of a rotational angle detector according to the first embodiment of the present invention. In this case, the rotational angle detector is used to detect the rotational angle of the steering wheel of a vehicle.

As illustrated in FIG. 1, the rotational angle detector according to this embodiment comprises: a rotational angle detecting section 1; a control section (CPU) 2 incorporating an angle calculating section 8 and a decision section 9; a memory 3; an abnormality signal generator 4; a bus line 5 for LAN (local area network); a controller 6; and a controlled system 7.

Here, the rotational angle detecting section 1 is, for example, a rotary sensor like the one shown in FIG. 10A and FIG. 10B which comprises a case 71, a rotor 72, a rotary shaft 73, a bearing 74, a worm gear 75, a slider 76, a first magnet $77_1$, a second magnet $77_2$, a first Hall element $78_1$, a second Hall element $78_2$, a third Hall element $78_3$, and a circuit board 79. In this case, the rotor 72 is connected with the steering shaft of the vehicle at its center and there are many gear teeth on its circumference. The rotary shaft 73, around which the worm gear 75 is fitted, rotates in conjunction with the worm gear 75. The screw grooves in the outer surface of the rotary shaft 73 engage with the screw grooves in the inner surface of the slider 76 so that the slider 76 slides in the axial direction of the rotary shaft 73 as the rotary shaft 73 turns. When the worm gear 75 and the gear teeth of the rotor 72 engage with each other and the rotor 72 turns, the rotary shaft 73 also turns by the mediation of the worm gear 75 at a prescribed rotation ratio with respect to the rotor 72. The worm gear 75 has a cylindrical magnet holder 75A at one end of it and the cylindrical first magnet $77_1$ is fitted on the circumference of the magnet holder 75A. The slider 76 has a planar second magnet $77_2$ attached onto its outer surface. Attached on the circuit board 79, which is arranged in parallel to the rotary shaft 73, are the first Hall element $78_1$, the second Hall element $78_2$ and the third Hall element $78_3$. The first Hall element $78_1$ and the second Hall element $78_2$ are located adjacent to the outer surface of the first magnet $77_1$, forming an angle of approximately 90 degrees with respect to the central axis of the first magnet $77_1$. The third Hall element $78_3$ is located adjacent to the outer surface of the second magnet $77_2$.

In the rotational angle detecting section 1, a series of operations are performed as follows. As the steering wheel turns, the steering shaft turns simultaneously, which makes the first magnet $77_1$ come closer periodically, causing a magnetic flux change. This magnetic flux change is detected by the first Hall element $78_1$ and second Hall element $78_2$. Likewise, the magnetic flux change caused by the second magnet $77_2$ coming closer periodically is detected by the third Hall element $78_3$. Based on the above-mentioned detection, the first Hall element $78_1$, second Hall element $78_2$, and third Hall element $78_3$ generate a first angle detection signal, a second one, and a third one, respectively. The first to third angle detection signals thus generated are sent to the control section 2 in a short cycle. Here, the first to third angle detection signals are the first angle detection signal 51, second angle detection signal 52 and third angle detection signal 53 as shown in FIG. 8, respectively, and each of them has an amplitude corresponding to the rotational angle of the steering shaft.

The memory 3 stores a maximum angle detection signal which can be fed to the control section 2, namely an allowable maximum angle value. The abnormality signal generator 4 generates an abnormality signal under the control of the control section 2. This embodiment assumes that the controlled system 7 is a suspension system or traction control system in a vehicle.

The output end of the rotational angle detection section 1 is connected to the input end of the control section 2. The control section 2 is connected to the memory 3 and the abnormality signal generator 4 and also its output end is connected to the input end of the controller 6 through the local area network bus line 5. The control end of the controller 6 is connected to the controlled system 7.

How the operational angle detector according to this embodiment operates will be explained next.

Figure 5:
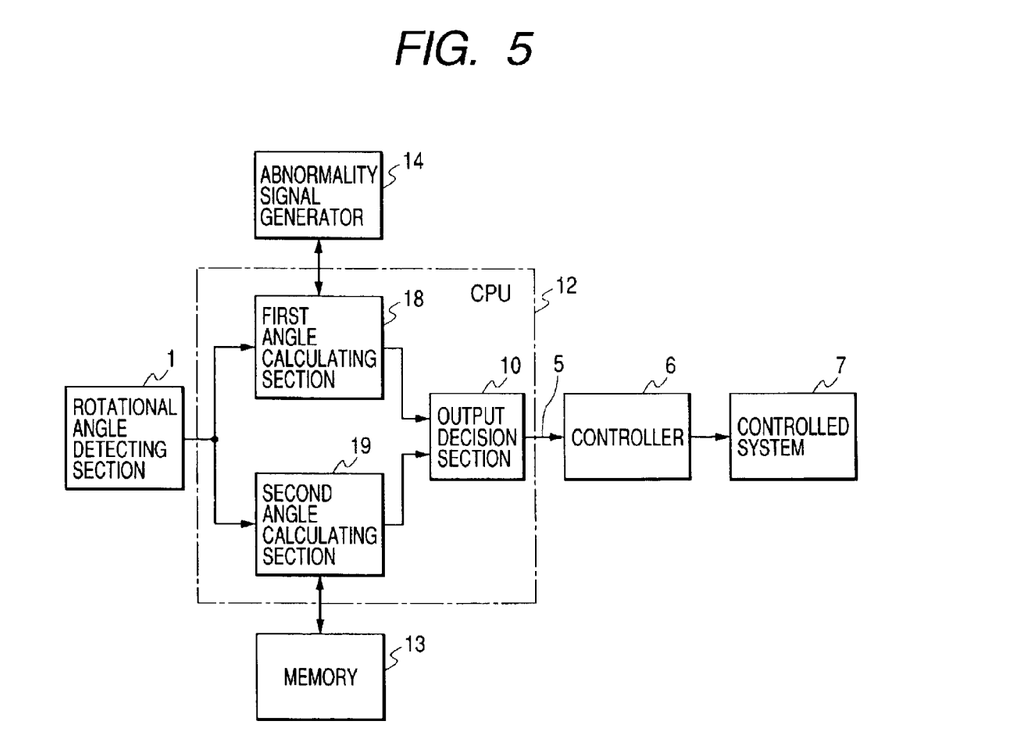
FIG. 5 is a block diagram showing the main structure of a rotational angle detector according to a second embodiment of the present invention.

As the operator turns the steering wheel, the rotational angle detecting section 1 generates a first angle detection signal 51 and a second angle detection signal 52, which are sent to the control section 2, as illustrated in FIG. 5. For the first angle detection signal 51 and second angle detection signal 52, the peak-to-peak amplitude is 4.0 V, the cycle is 90 degrees in terms of steering wheel rotational angle, the phase difference is a quarter of the wavelength, namely 22.5 degrees in terms of steering wheel rotational angle.

Figure 2:
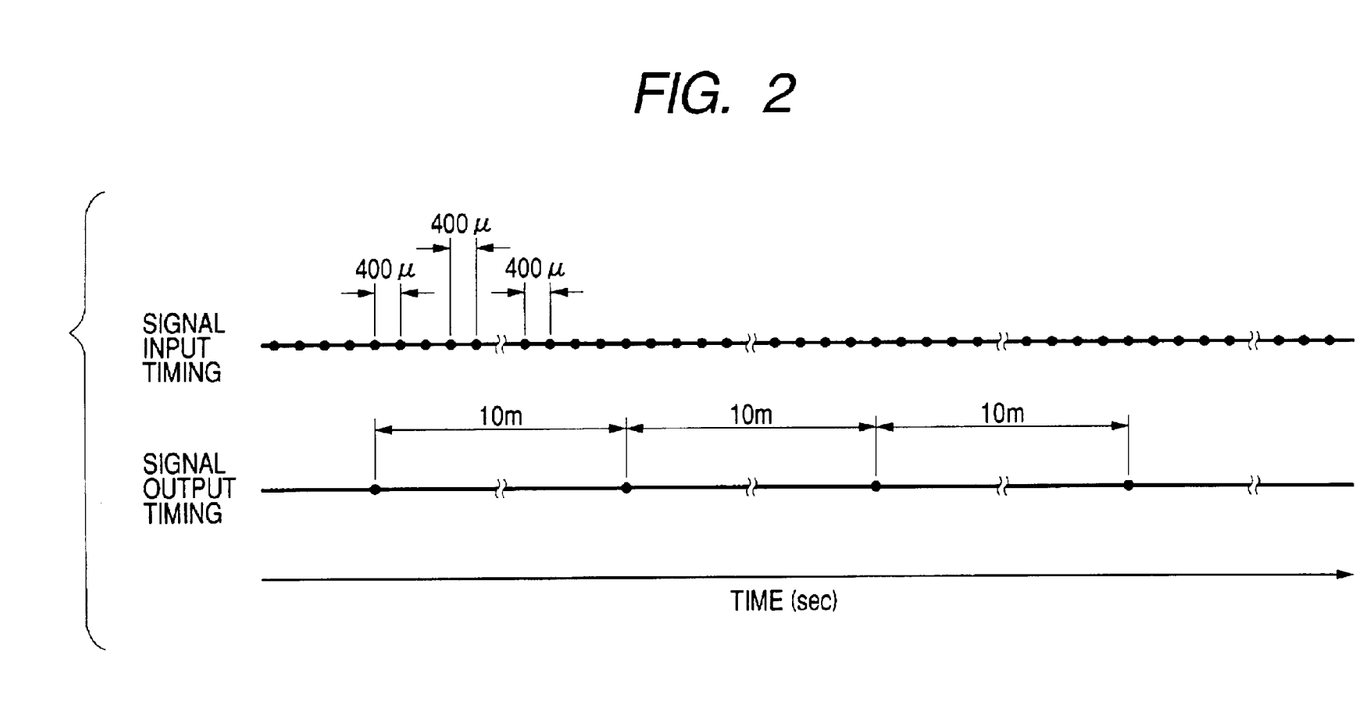
FIG. 2 shows input timing for the angle detection signals being fed to the control section and output timing for the angle set signal being outputted from the control section in the rotational angle detector shown in FIG. 1, as an example.

FIG. 2 shows an example of input timings for an angle detection signal to be fed to the control section 2, and output timings for an angle set signal to be outputted from the control section 2.

In FIG. 2, the black dots in the upper portion (first line) represent when an angle detection signal is inputted, while the black dots in the lower portion (second line) represent when an angle set signal is outputted. The horizontal axis represents time in seconds.

As the first portion in FIG. 2 indicates, angle detection signals are successively fed to the control section with a short cycle of 400 microseconds ($\mu$sec), while angle set signals are successively outputted from the control section 2 with a longer cycle of 10 milliseconds (msec). Thus, the control section 2 outputs an angle set signal every time an angle detection signal is inputted 25 times.

Figure 3:
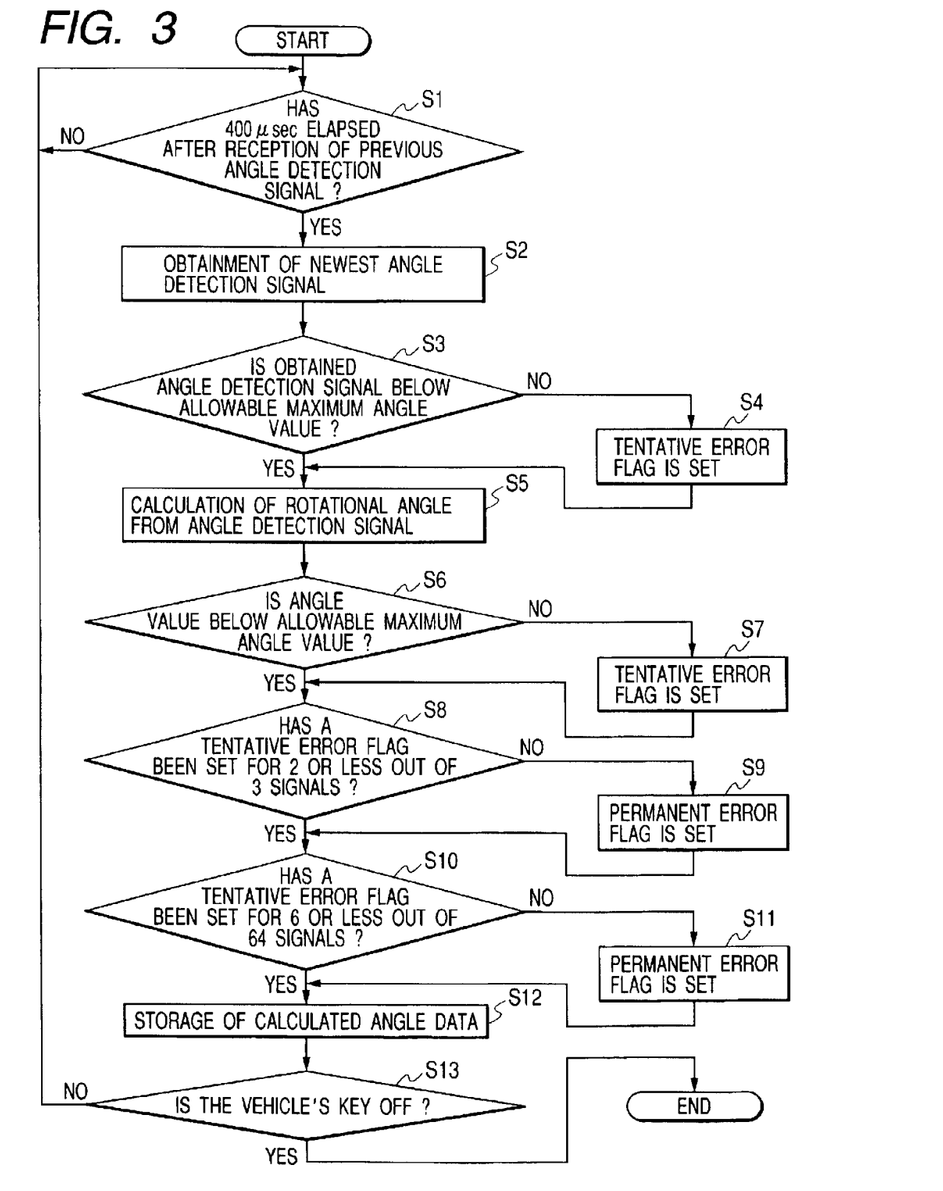
FIG. 3 is a flowchart showing the control section's operational sequence from calculation of an angle from the fed angle detection signals to temporary storage of the angle data in a memory.
Figure 4:
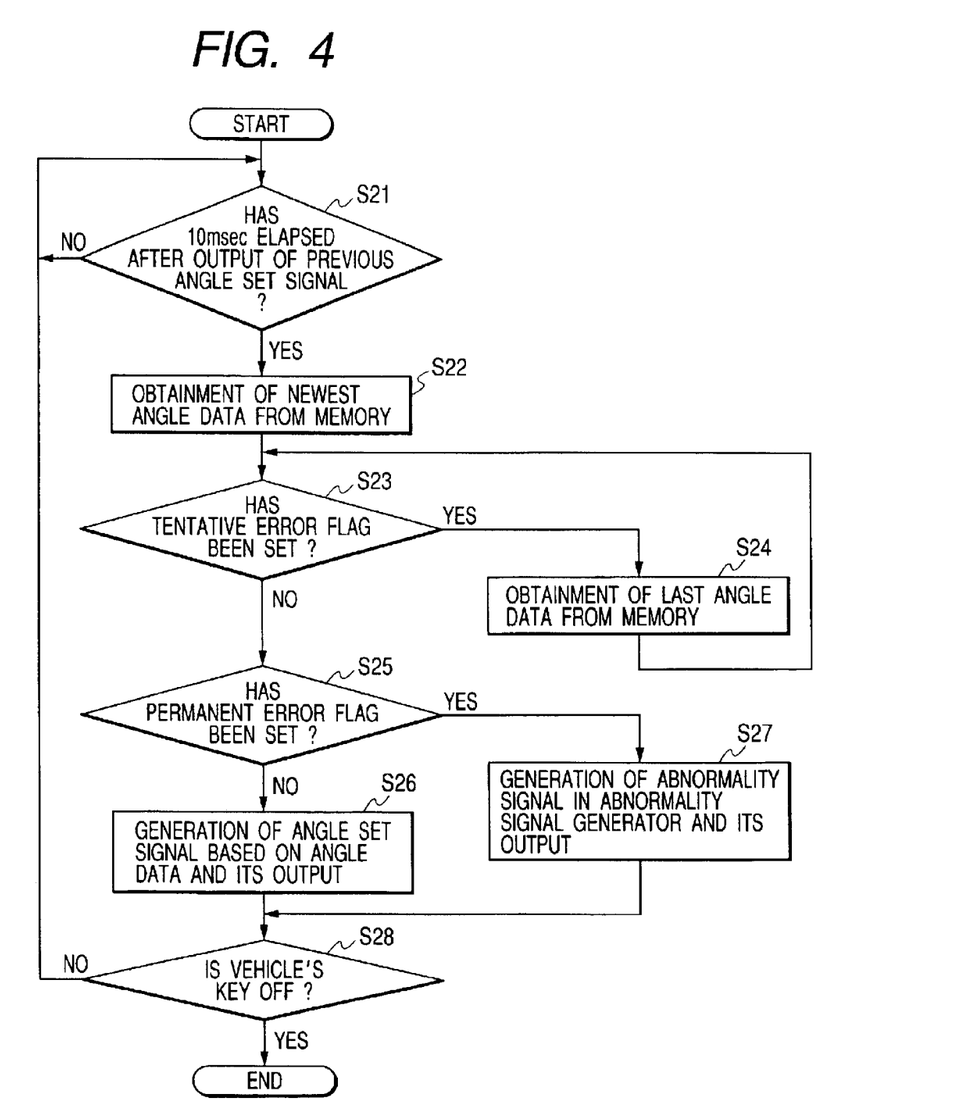
FIG. 4 is a flowchart showing the control section's operational sequence from reading of the angle data from the memory to output of an angle set signal based on the read angle data.

FIG. 3 and FIG. 4 are flowcharts showing the operational process concerning how the control section 2 processes the received angle detection signal and outputs an angle set signal. FIG. 3 shows the operational steps (the first half of the process) in which an angle value is calculated from the received angle detection signal and stored in the memory 3 temporarily; and FIG. 4 shows the operational steps (the second half of the process) about how the angle value read from the memory 3 is used to output an angle set signal.

First, referring to the flowchart in FIG. 3, the first half of the process which is carried out in the control section 2 will be explained next.

At step S1, the control section 2 decides whether 400 $\mu$sec have elapsed after reception of the previous angle detection signal. If yes, or if it decides that 400 $\mu$sec have elapsed after reception of the previous angle detection signal, then it goes to the next step S2; on the other hand, if no, or if it decides that 400 $\mu$sec have not elapsed after reception of the previous angle detection signal, then step S1 is carried out repeatedly.

At step S2, the control section 2 obtains the newest angle detection signal from the rotational angle detecting section 1.

At step S3, the control section 2 decides whether or not the angle detection signal just obtained is below the allowable maximum angle value stored in the memory 3. If yes, or if it decides that the angle detection signal just obtained is below the allowable maximum angle value, then it jumps to step S5; on the other hand, if no, or if it decides that the angle detection signal just obtained is not below the allowable maximum angle value, then it goes to the next step S4.

At step S4, the control section 2 sets a tentative error flag for the obtained angle detection signal.

Then, at step S5, the control section 2 calculates the rotational angle from the obtained angle detection signal using its internal angle calculating section 8.

Then, at step S6, the control section 2 decides whether or not the calculated angle value is below the allowable maximum angle value stored in the memory 3. If yes, or if it decides that the calculated angle is below the allowable maximum angle value, then it jumps to step S8; on the other hand, if no, or if it decides that the calculated angle is not below the allowable maximum angle value, then it goes to the next step S7.

At step S7, the control section 2 sets a tentative error flag for the calculated angle value.

At step S8, using its internal decision section 9, the control section 2 decides whether or not the angle detection signals or rotational angle values for which a tentative error flag has been set are at most two (i.e. 0, 1 or 2) out of three successively fed ones. If yes, or if it decides that such signals or values are 2 or less out of the three ones, then it jumps to step S10; on the other hand, if no, or if it decides that such signals or values are not 2 or less out of the three ones, then it goes to the next step S9.

At step S9, the control section 2 converts a tentative flag set for the angle detection signals or rotational angle values into a permanent error flag.

At step S10, using its internal decision section 9, the control section 2 decides whether or not the tentative angle detection signals or rotational angle values for which a tentative error flag has been set are six or less out of 64 successively fed ones. If yes, or if it decides that the number of such signals or values out of the 64 successively supplied ones is 6 or less, then it jumps to step S12; on the other hand, if no, or if it decides that the number of such signals or values out of the 64 successively supplied ones is more than 6, then it goes to the next step S11.

At step S11, the control section 2 converts a tentative flag temporarily set for the angle detection signals or rotational angle values into a permanent error flag.

At step S12, the control section 2 sends the angle data calculated at step S5 to the memory 3, where it is stored.

At step S13, the control section 2 decides whether or not the vehicle's key has been turned off. If yes, or if it decides that the key has been turned off, then this series of steps is finished; on the other hand, if no, or if it decides that the key has not been turned off yet, then it returns to the first step S1 and the procedure from step S1 is repeated.

Next, referring to the flowchart in FIG. 4, the second half of the process which is carried out in the control section 2 will be explained.

At step S21, the control section 2 decides whether or not 10 msec have elapsed after output of the previous angle set signal. If yes, or if it decides that 10 msec have elapsed after output of the previous angle set signal, then it goes to the next step S22; on the other hand, if no, or if it decides that 10 msec have not elapsed yet after output of the previous angle set signal, then step S21 is carried out repeatedly.

At step S22, the control section 2 reads and obtains the newest angle value from the memory 3.

At step S23, the control section 2 decides whether or not a tentative error flag has been set for the obtained newest angle value. If no, or if it decides that a tentative error flag has not been set for the newest angle value, then it jumps to step S25; on the other hand, if yes, or if it decides that a tentative error flag has been set for the newest angle value, then it goes to the next step S24.

At step S24, the control section 2 reads and obtains the last angle value from the memory 3. After obtaining that angle value, it returns to step S23 and the procedure from step S23 is repeated.

At step S25, the control section 2 decides whether or not a permanent error flag has been set for the obtained angle value. If no, or if it decides that a permanent error flag has not been set for the obtained angle value, then it goes to the next step S26; on the other hand, if yes, or if it decides that a permanent error flag has been set for the obtained angle value, then it jumps to step S27.

At step S26, using the obtained angle value, the control section 2 generates an angle set signal and sends the generated angle set signal to the local area network bus line 5.

At step S27, the control section 2 drives the abnormality signal generator 4 to generate an abnormality signal and sends the generated abnormality signal to the local area network bus line 5.

At step S28, the control section 2 decides whether or not the vehicle's key has been turned off. If yes, or if it decides that the key has been turned off, then this series of steps as shown in the flowchart is finished; on the other hand, if no, or if it decides that the key has not been turned off yet, then it returns to the first step S21 and the procedure from step S21 is repeated.

Then, as an angle set signal is sent from the control section 2 through the local area network bus line 5 to the controller 6, the controller 6 controls the vehicle's suspension system or traction control system as a controlled system 7 according to the received angle set signal.

On the other hand, if an abnormality signal is sent from the control section 2 to the local area network bus line 5, the abnormality signal is transmitted to an alarm unit or display unit (neither shown) which is connected with the local area network bus line 5, and the alarm unit issues an alarm or the display unit shows the presence of an abnormal condition, so a person in the vehicle can immediately notice the presence of an abnormality in the operation of the rotational angle detector. When the control section 2 outputs an abnormality signal, no angle set signal is outputted and therefore it is unlikely that the controlled system 7 is improperly controlled due to output of an incorrect angle set signal.

Furthermore, the control section 2 eliminates the possibility of output of an incorrect angle value for the following reason. Even if a tentative error flag has been set for an angle value or, for example, if the angle value has been decided to be at least incorrect due to temporary external disturbance, noise or other reason though it has not been decided to be a permanent error, the angle value for which the tentative error flag has been set through steps S23 and S24 is not outputted but the stored previous angle data is traced back to pick up and output the angle data which has been decided as normal; therefore, the possibility of output of abnormal angle data is eliminated.

The rotational angle detector according to the first embodiment has been explained on the assumption that the input short cycle for angle detection signals sent from the control section 2 is 400 μsec, and the output long cycle for angle detection signals outputted from the control section 2 is 10 msec; however, the input short cycle and output long cycle for angle detection signals according to the present invention are not limited to 400 μsec and 10 msec respectively. It is needless to say that other cycle times near to 400 μsec and 10 msec may be used.

The rotational angle detector according to the above embodiment has been explained on the assumption that a permanent error flag is set for an angle value on condition that in the short run the angle detection signals or rotational angle values for which a tentative error flag has been set are two or more out of three successively fed ones and in the long run the angle detection signals or rotational angle values for which a tentative error flag has been set are six or more out of 64 successively fed ones. However, it is obvious that in the present invention, the condition for a permanent flag to be set for an angle value is not limited thereto; the frequency of such signals or angle values may be any number near to the above numbers.

The rotational angle detector according to the above embodiment has been explained on the assumption that it is used to detect the rotational angle of the steering wheel of a vehicle; however, the application of the rotational angle detector according to the present invention is not limited to rotational angle detection of such a steering wheel. It may also be used to detect the rotational angle of a device similar to a steering wheel.

Next, a second embodiment of the present invention will be described referring to the relevant drawings.

The same components of the rotational angle detector as those shown in FIG. 1 to FIG. 4 are designated with the same reference numerals and their details are omitted here.

FIG. 5 is a block diagram showing the main structure of a rotational angle detector according to the second embodiment of the present invention. In this case, the rotational angle detector is used to detect the rotational angle of the steering wheel of a vehicle.

As illustrated in FIG. 5, the rotational angle detector according to this second embodiment comprises: a rotational angle detecting section 1; a control section (CPU) 12 incorporating a first angle calculating section 18, a second angle calculating section 19 and an output decision section 10; a memory 13; an abnormality signal generator 14; a bus line 5 for LAN (local area network); a controller 6; and a controlled system 7.

In the rotational angle detecting section 1, a series of operations are performed as follows. As the steering wheel turns, the steering shaft turns simultaneously, which makes the first magnet $77_1$ of the rotary sensor shown in FIG. 10A and FIG. 10B come closer periodically, causing a magnetic flux change. This magnetic flux change is detected by the first Hall element $78_1$ and second Hall element $78_2$. Likewise, the magnetic flux change caused by the second magnet $77_2$ coming closer periodically is detected by the third Hall element $78_3$. Based on the above-mentioned detection, the first Hall element $78_1$, second Hall element $78_2$, and third Hall element $78_3$ generate a first angle detection signal, a second one, and a third one, respectively. The first to third angle detection signals thus generated are sent to the control section 12 in a short cycle. Here, the first angle detection signal 51, second angle detection signal 52 and third angle detection signal 53 as shown in FIG. 8 each have an amplitude correspondent to the rotational angle of the steering shaft.

The memory 13 stores a possible maximum output of difference between the first angle set signal and second angle set signal, namely an allowable maximum setting. The abnormality signal generator 14 generates an abnormality signal under the control of the control section 12. The local area network (LAN) bus line 5 is installed in the vehicle. This embodiment assumes that the controlled system 7 is a suspension system or automatic transmission system in a vehicle.

The output end of the rotational angle detection section 1 is connected to the input end of the control section 12. The control section 12 is connected to the memory 13 and the abnormality signal generator 14 and also its output end is connected to the input end of the controller 6 through the local area network bus line 5. The control end of the controller 6 is connected to the controlled system 7. In the control section 12, the input end of the first angle calculating section 18 is connected to the input end of the second angle calculating section 19 and its output end is connected to the first input end of the output decision section 10. The output end of the second angle calculating section 19 is connected to the second input end of the output decision section 10.

How the operational angle detector with the above structure operates will be explained next.

As the operator turns the steering wheel, the rotational angle detecting section 1 generates a first angle detection signal 51 and a second angle detection signal 52, which are sent to the control section 12, as illustrated in FIG. 8. For the first angle detection signal 51 and second angle detection signal 52, the peak-to-peak amplitude is 4.0 V, the cycle is 90 degrees in terms of steering wheel rotational angle, the phase difference is a quarter of the wavelength, namely 22.5 degrees in terms of steering wheel rotational angle.

In this embodiment, input of an angle detection signal from the rotational angle detecting section 1 to the control section 12 and output of an angle set signal from the control section 12 take place as follows; for example, angle detection signals are successively supplied to the control section 12 with a short cycle of 400 microseconds ($\mu$sec), while angle set signals are successively outputted from the control section 12 with a longer cycle of 10 milliseconds (msec). As a result, the control section 12 outputs an angle set signal every time an angle detection signal is fed 25 times.

As an angle detection signal is fed from the rotational angle detecting section 1 to the control section 12, the control section 12 makes the received angle detection signal enter the first angle calculating section 18 and second angle calculating section 19 simultaneously. The first angle calculating section 18 and second angle calculating section 19 make calculation for the entered angle detection signal in different modes as stated later, so that the first angle calculating section 18 generates a first angle set signal and the second angle calculating section 19 generates a second angle set signal and the generated first and second angle set signals are sent to the output decision section 10. The output decision section 10 calculates the difference between the first angle set signal and second angle set signal and compares the calculated difference with the allowable maximum setting read from the memory 13.

If the output decision section 10 decides that the calculated difference is below the allowable maximum setting, the control section 12 and the parts related to the control section 12 are considered to be working normally. If so, the control section 12 selects either the first angle set signal or the second angle set signal, whichever represents a more desirable condition, when it is time to output an angle set signal; for example, if it selects the first angle set signal, it outputs the selected first angle set signal to the local area network bus line 5 as a normal angle set signal.

On the other hand, if the output decision section 10 decides that the calculated difference is above the allowable maximum setting, the control section 12 and the parts related to the control section 12 are considered to be working abnormally. If so, when it is time to output an angle set signal, the control section 12 selects either the first angle set signal or the second angle set signal, whichever represents a more desirable condition, and also activates the abnormality signal generator 4 to generate an abnormality signal; then it outputs the selected angle set signal and the generated abnormality signal to the local area network bus line 5.

After this, the angle set signal and abnormality signal sent from the control section 12 to the local area network bus line 5 are sent to the controller 6. The controller 6 controls the vehicle's suspension system or traction control system as the controlled system 7 according to the angle set signal it has received.

On the other hand, the abnormality signal sent from the control section 12 to the local area network bus line 5 is sent to an alarm unit or display unit (neither shown) which is connected with the local area network bus line 5. When the abnormality signal is received, in response to the abnormality signal, the alarm unit issues an alarm or the display unit shows the presence of an abnormal condition. Thus, a person in the vehicle can immediately notice the presence of an abnormality. Since the control section 12 outputs an abnormality signal as well as an angle set signal, it is unlikely that the controlled system 7 is controlled improperly due to output of an incorrect angle set signal.

Figure 6:
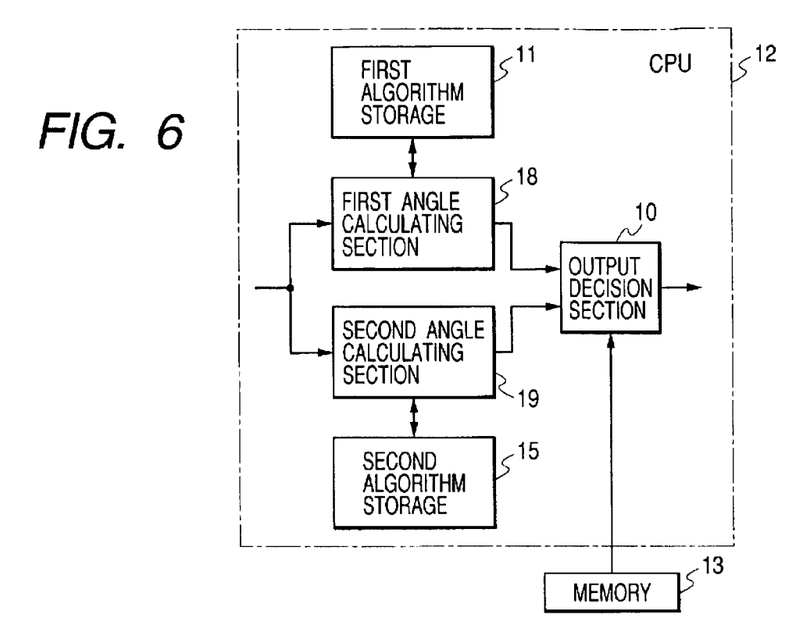
FIG. 6 is a block diagram showing the detailed structure of the control section shown in FIG. 5 as a first example.
Figure 7:
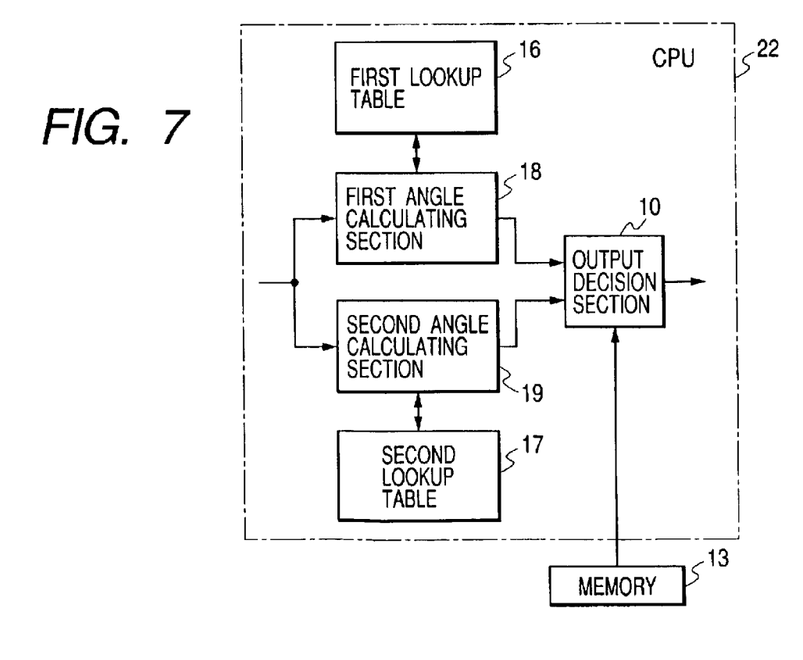
FIG. 7 is a block diagram showing the detailed structure of the control section shown in FIG. 5 as a second example.

FIG. 6 and FIG. 7 are block diagrams showing the structure of the control section 12 shown in FIG. 5 in more detailed form; FIG. 6 shows a first example thereof and FIG. 7 is a second example thereof.

In FIG. 6 and FIG. 7, the same components as those shown in FIG. 5 are designated with the same reference numerals.

As shown in FIG. 6, in addition to the first angle calculating section 18, second angle calculating section 19 and output decision section 10, the control section 12 as the first example incorporates a first algorithm storage 11 and a second algorithm storage 15 where the former is connected with the first angle calculating section 18 and the latter is connected with the second angle calculating section 19 and contains an algorithm different from that stored in the first algorithm storage 11; and the output decision section 10 is connected with the memory 13.

As shown in FIG. 7, in addition to the first angle calculating section 18, second angle calculating section 19 and output decision section 10, the control section 22 as the second example incorporates a first lookup table 16 and a second lookup table 17 where the former is connected with the first angle calculating section 18 and the latter is connected with the second angle calculating section 19 and different from the first lookup table 16; and the output decision section 10 is connected with the memory 13.

First, how the first example of the control section 12 operates will be explained next.

The first algorithm storage 11 stores an algorithm which detects the angle in terms of $\sin^{-1}\theta$ according to angle detection signals from the rotational angle detecting section 1 and the second algorithm storage 15 stores an algorithm which detects the angle in terms of $\cos^{-1}\theta$ according to angle detection signals from the rotational angle detecting section 1.

The first algorithm storage 11 detects the angle in terms of $\sin^{-1}\theta$ according to angle detection signals from the rotational angle detecting section 1; based on the detected angle data, the first angle calculating section 18 generates a first angle set signal and sends it to the output decision section 10, while the second algorithm storage 15 generates a second angle set signal 19 based on the angle data detected in terms of $\cos^{-1}\theta$ in the second algorithm storage 15 and sends it to the output decision section 10. The output decision section 10 calculates the difference between the first angle set signal and second angle set signal which it has received, and compares the calculated difference with the allowable maximum setting read from the memory 13.

As a result of the comparison made in the output decision section 10, if it is decided that the calculated difference is smaller than the allowable maximum setting, the control section 12 and the parts related to the control section 12 are considered to be working normally. If so, when it is time to output an angle set signal, the control section 12 selects either the first angle set signal or the second angle set signal, whichever represents a more desirable condition; for example, if it selects the first angle set signal, it outputs the selected first angle set signal through the local area network bus line 5 to the controller 6.

On the other hand, as a result of the comparison made in the output decision section 10, if it is decided that the calculated difference is larger than the allowable maximum setting, the control section 12 and the parts related to the control section 12 are considered to be working abnormally. If so, when it is time to output an angle set signal, the control section 12 selects either the first angle set signal or the second angle set signal, whichever represents a more desirable condition (for example, it selects an angle set signal with a voltage nearer to 2.5 V) and outputs the selected angle set signal as a normal angle set signal through the local area network bus line 5 to the controller 6; in addition, it activates the abnormality signal generator 14 to generate an abnormality signal and sends the selected angle set signal and the abnormality signal through the local area network bus line 5 to the controller 6.

Accordingly, in the first example, an angle set signal carrying angle data detected with high accuracy is constantly fed and if an abnormality occurs in the operation of the rotational angle detector, a warning is immediately given; furthermore, the control section 12 outputs an abnormality signal in addition to a properly selected angle set signal. Therefore, it is unlikely that the controlled system 7 is improperly controlled due to output of an incorrect angle set signal.

In the second example, first of all the first table 16 is created based on the result of V=tan θ calculation and then the second table 17 is created based on the result of sin θ and cos θ calculation and multiplication/division thereof using the relation V=A (sin θ/cos θ). Thus, these tables 16 and 17 are structurally different and created as different tables though they are mathematically or theoretically identical. When the first and second tables 16 and 17 are created in this way and incorporated in a certain product, even if a fault occurs for some reason, it is very unlikely that both the tables contain faults. This means that an abnormality can be detected with higher accuracy because a decision about output is made using each of the first and second tables 16 and 17. By contrast, in the conventional method, a decision about output is made only according to the table based on the result of, for example, V=tan θ calculation so it is less easy to detect such an abnormality.

In the second example, when the first lookup table 16 and the second lookup table 17 are different, even if either of the first lookup table 16 and second lookup table 17 contains some fault, the result of comparison made in the output decision section 10 will be different from the normal result whenever that fault is picked up, which makes it possible to identify the presence of the fault.

The rotational angle detector according to the above embodiment has been explained on the assumption that the input cycle of angle detection signals being fed to the control section 22 is 400 microseconds and the output cycle of angle detection signals being outputted from the control section 22 is 10 milliseconds; however, the input and output cycles for angle detection signals according to the present invention are not limited to 400 microseconds and 10 milliseconds, respectively. It is needless to say that other cycle times near to 400 microseconds and 10 milliseconds may be used.

The rotational angle detector according to the above embodiment has been explained on the assumption that it is used to detect the rotational angle of the steering wheel of a vehicle; however, the application of the rotational angle detector according to the present invention is not limited to rotational angle detection of such a steering wheel. It may also be used to detect the rotational angle of a device similar to a steering wheel.

As discussed so far, according to one aspect of the present invention, the memory stores an allowable maximum setting as the maximum output data which may express the difference between the first angle set signal and second angle set signal; and the control section concurrently performs a first calculation step and a second calculation step for the angle detection signals fed from the rotational angle detecting section to generate a first angle set signal and a second angle set signal, calculates the difference between the generated first angle set signal and second angle set signal, compares the calculated difference with the allowable maximum setting read from the memory, and if the calculated difference is judged as being below the allowable maximum setting, generates and outputs a given angle set signal when it is time to output an angle set signal; on the other hand, if the calculated difference is judged as being above the allowable maximum setting, generates and outputs an abnormality signal in addition to a given angle set signal when it is time to output an angle set signal. Therefore, thanks to output of the abnormality signal, the user of the rotational angle detector can not only immediately be notified of the presence of an abnormality in the operation of the rotational angle detector but also avert the risk of the controlled system being improperly controlled due to the feed of an incorrect angle set signal.

As mentioned earlier, according to another aspect of the present invention, the memory stores the allowable maximum angle value for angle detection signals; and the control section counts the number of times when the angle detection signal as fed within the long output cycle for angle set signals is beyond the allowable maximum signal and, if the count is judged as being above a preset number, outputs an abnormality signal instead of the angle set signal in the next cycle for angle set signal output. Therefore, thanks to output of the abnormality signal, the user of the rotational angle detector can not only immediately be notified of the presence of an abnormality in the operation of the rotational angle detector but also avert the risk of the controlled system being improperly controlled due to the feed of an incorrect angle set signal.

What is claimed is:

1. A rotational angle detector comprising:
   a rotational angle detecting section that detects an angle detection signal correspondent to a rotational state of a rotor in a short cycle and feeds the angle detection signal to a control section;
   the control section that calculates the angle detection signal fed from the rotational angle detecting section and sends an angle set signal through a controller to a controlled system; and
   a memory that stores the angle detection signal temporarily and also stores an allowable maximum angle value of the angle detection system,
   wherein the control section makes an output cycle for the angle set signal longer than a detection cycle for the angle detection signal and counts a number of times when the detection angle signal as fed within a long output cycle for the angle detection signal is beyond the allowable maximum angle value and, if the count is judged as being beyond a preset number, outputs an abnormality signal instead of the angle set signal.

2. The rotational angle detector according to claim 1, wherein the detection cycle for the angle detection signal is 400 μsec and the output cycle for the angle set signal is 10 msec.

3. The rotational angle detector according to claim 1, wherein the count is judged as being beyond the preset number when two out of three consecutive counts are found beyond the preset number.

4. The rotational angle detector according to claim 1, wherein the count is judged as being beyond the preset number when six out of 64 consecutive counts are found beyond the preset number.

5. A rotational angle detector comprising:
a rotational angle detecting section which detects an angle detection signal correspondent to a rotational state of a rotor and feeds the angle detection signal to a control section;
the control section calculates the angle detection signal fed from the rotational angle detecting section to generate an angle set signal and sends the generated angle set signal through a controller to a controlled system; and
a memory which stores an allowable maximum setting, wherein the control section concurrently performs a first calculation and a second calculation for the fed angle detection signal fed from the rotational angle detecting section to generate a first angle set signal and a second angle set signal, calculates a difference between the first angle set signal and second angle set signal, compares the calculated difference with the allowable maximum setting, and if the calculated difference is judged as being above the allowable maximum setting, outputs an abnormality signal in addition to the angle set signal.

6. The rotational angle detector according to claim 5, wherein the control section performs the first calculation and the second calculation using different lookup tables.

7. The rotational angle detector according to claim 5, wherein the control section performs the first calculation and the second calculation using different algorithms.

8. The rotational angle detector according to claim 5, wherein the control section detects the angle detection signal in a short cycle and outputs the angle set signal in a cycle longer than the detection cycle for the angle detection signal.

9. The rotational angle detector according to claim 5, wherein the first calculation and the second calculation are performed by different control sections.

10. A rotational angle detector comprising:
a rotational angle detecting section that detects an angle detection signal correspondent to a rotational state of a rotor;
a control section that receives the angle detection signal in communication with the rotational angle detection section, performs operations using the angle detection signal, and in communication through a controller, transmits an angle set signal to a controlled system; and
a memory that stores the angle detection signal in communication with the control section, an allowable maximum angle value for the rotational angle detector, a count of a number of times that the angle detection signal exceeds an allowable maximum angle value, and a preset condition, wherein an angle set signal time period is longer than an angle detection signal time period so that a plurality of the angle detection signals are received in the angle set signal time period.

11. The rotational angle detector according to claim 10, wherein the control section increments the count.

12. The rotational angle detector according to claim 10, wherein the control section compares the count to the preset condition and communicates an abnormality signal when the count exceeds the preset condition.

13. The rotational angle detector according to claim 12, wherein the preset condition is when the count is set to two out of three consecutive times.

14. The rotational angle detector according to claim 12, wherein the preset condition is when the count is set to six out of sixty-four consecutive times.

15. A method of determining an angle set signal for a controlled system from an angle detection signal correspondent to a rotational state of a rotor comprising:
measuring a plurality of the angle detection signals from a rotational angle detection section during an angle set signal time period;
comparing each angle detection signal to an allowable maximum angle value;
counting a number of times when the angle detection signals exceed the allowable maximum angle value;
comparing a count of the number of times that the angle detection signals exceed the allowable maximum angle value to a preset condition; and
sending an abnormality signal when the count exceeds the preset condition.

16. A rotational angle detector comprising:
a rotational angle detecting section detecting an angle detection signal correspondent to a rotational state of a rotor in a detection cycle and feeding the angle detection signal to a control section;
the control section calculating the angle detection signal fed from the rotational angle detecting section and sending an angle set signal through a controller to a controlled system; and
a memory storing the angle detection signal temporarily and also storing an allowable maximum angle value of the angle detection system,
wherein the control section makes an output cycle for the angle set signal that is longer than the detection cycle for the angle detection signal, counts a number of times when the angle detection signal fed within the output cycle for the angle detection signal is beyond the allowable maximum angle value, compares the count to a preset condition, and
if the count is equal to zero outputs an angle set signal based on the last angle detection signal,
if the count is greater than zero but less than or equal to the preset condition outputs an angle set signal based on an angle detection signal that was stored in memory and which was not beyond the allowable maximum angle value, and
if the count exceeds the preset condition outputs an abnormality signal instead of the angle set signal.

17. The rotational angle detector according to claim 16, wherein the angle detection signal that was stored in memory and was not beyond the allowable maximum angle value is a latest angle detection signal that was stored in memory.

18. The rotational angle detector according to claim 16, wherein the detection cycle for the angle detection signal is at most 400 microseconds and the output cycle for the angle set signal is at most 10 milliseconds.

19. The rotational angle detector according to claim 16, wherein the preset condition is when the count is set to two out of three consecutive times.

20. The rotational angle detector according to claim 16, wherein the preset condition is when the count is set to six out of sixty-four consecutive times.

21. A method of determining an angle set signal for a controlled system from an angle detection signal correspondent to a rotational state of a rotor comprising:

detecting the angle detection signal from a rotational angle detection section;

performing a first calculation and a second calculation with the angle detection signal;

generating a first angle set signal and a second angle set signal from the first calculation and the second calculation, respectively;

calculating a difference between the first angle set signal and the second angle set signal;

comparing the difference with an allowable maximum setting; and determining whether the difference exceeds the allowable maximum setting and when the difference exceeds the allowable maximum setting, sending an abnormality signal with one of the first and second angle set signals.

* * * * *